United States Patent [19]

Naka et al.

[11] Patent Number: 5,200,040
[45] Date of Patent: Apr. 6, 1993

[54] METHOD FOR RECTIFICATION AND APPARATUS THEREFOR

[75] Inventors: Yuji Naka, Yokohama; Tatsuo Sato; Akihiro Kawashima, both of Tokyo, all of Japan

[73] Assignee: NKK Corporation, Tokyo, Japan

[21] Appl. No.: 668,742

[22] Filed: Mar. 13, 1991

Related U.S. Application Data

[63] Continuation-in-part of Ser. No. 344,296, Apr. 27, 1989, abandoned.

[30] Foreign Application Priority Data

Oct. 21, 1988 [JP] Japan .................... 63-265376

[51] Int. Cl.⁵ ............................................. B01D 3/00
[52] U.S. Cl. ...................................... 203/25; 196/111; 196/134; 203/96; 203/97; 203/98; 203/100; 208/350; 208/358; 208/363
[58] Field of Search ............... 203/96, 98, 97, DIG. 8, 203/DIG. 9, 100, 25, DIG. 25; 202/237, 158, 254; 159/47.1, 16.3; 196/111, 120, 134; 208/350, 356, 358, 363

[56] References Cited

U.S. PATENT DOCUMENTS

| | | | |
|---|---|---|---|
| 1,302,988 | 5/1919 | Steinschneider | 196/134 |
| 1,646,929 | 10/1927 | Phelan | 196/111 |
| 2,015,725 | 10/1935 | Packie | 196/111 |
| 3,437,584 | 4/1969 | Hamblin | 196/111 |
| 3,544,428 | 12/1970 | Mellbom | 196/111 |
| 3,846,249 | 11/1974 | Merriman | 196/111 |
| 3,966,559 | 6/1976 | Athanassiadis | 196/111 |
| 4,265,736 | 5/1981 | Thayer | 196/120 |
| 4,490,215 | 12/1984 | Bannon | 196/111 |

FOREIGN PATENT DOCUMENTS

587534 5/1960 Belgium.
0364659-A1 4/1990 European Pat. Off..

Primary Examiner—Virginia Manoharan
Attorney, Agent, or Firm—Frishauf, Holtz, Goodman & Woodward

[57] ABSTRACT

A method for rectification includes steps of supplying raw materials to a rectifying column from a raw material feed pipe; returning a refluent fluid from a refluxing pipe to the column; leading a hold-up liquid from a bottom tank having a higher surface to a bottom tank having a lower surface of a liquid in a bottom portion of the column; heating the hold-up in each of bottom tanks; exchanging heat by bringing a vapor produced by heating the bottoms into counter-current contact with the reluent liquid returned to the rectifying column on plates arranged in the rectifying column, taking out a vapor from the top of the rectifying column, and taking out bottoms from the bottom tank. An apparatus for rectification includes a rectifying column having a raw material feed pipe, an offtake pipe for taking out the vapor, a reflux pipe for returning the refluent liquid to the inside of the column in the upper portion of the rectifying column and plates for exchanging heat by bringing the vapor into contact with the refluent liquid. The bottom portion is divided into at least two bottom tanks having surfaces of liquid different in height, in the bottom portion of rectifying column. The bottoms in each of the bottom tanks are heated and an offtake pipe takes out the bottoms.

6 Claims, 7 Drawing Sheets

METHOD FOR RECTIFICATION AND APPARATUS THEREFOR

This application is a continuation-in-part of application Ser. No. 07/344,296, filed Apr. 27, 1989 abandoned.

BACKGROUND OF THE INVENTION

1. Field of the Invention

The present invention relates to a method for rectification and apparatus therefor.

2. Description of the Prior Arts

FIG. 10 is a explanatory view of an prior art rectifying column. Prior art rectifying column 1 will be described with specific reference to FIG. 10. A plurality of plates are arranged inside column body 2. Raw material feeding pipe 4 is mounted on the middle level of the column. Steam pipe 6 for heating hold-up is connected to bottom portion 5 of the column. On the other hand, reflux tank 8 is arranged for condensing a vapor from the top of the column and refluxing a part of the resultant by condensing the vapor. In reflux tank 8, there are arranged refluxing pipe 9 for refluxing condensed components of low boiling point, offtake pipe 10, through which a product is taken out, and drain pipe 12 for draining condensed water. Further, there is arranged second offtake pipe 11 for taking out components of high boiling point as bottoms from bottom portion 5 of the column.

The operation of rectifying column 1 constructed as described above will be explained. A hold-up is heated by blowing a steam from steam pipe 6 in bottom portion 5 of column 1. A part of the hold-up is made to rise as a vapor and brought into counter-current contact with a refluent fluid from the upper side of the column on each plate 3 thereof. In this way, condensation of the vapor and revaporization of a liquid obtained by the condensation of the vapor are repeatedly carried out. Components of low boiling point are taken out from the top of the column. A distillate condensed by means of condenser 7 is charged into reflux tank 8. Water obtained by condensing vapor is discharged from drain pipe 12. A part of the distillate is returned through refluxing pipe 9 to column body 2 and the other part thereof is recovered as a top-product through offtake pipe 10. Further, components of high boiling point as bottoms are taken out from bottom portion 5 of the column through second offtake pipe 11.

Operations have been carried out in the prior art rectifying column without any remarkable difference in heating energy charged into each of the compartments as far as there is no great difference in hold-up accumulated in each of the compartments of a rectifying column. It is pointed out that the reason is that the operations of the rectifying column of the prior art could be sufficiently carried out only by simply charging energy into the rectifying column without controlling charged energy so that there could be difference in the charged energy.

Actually, the amount of heating energy charged for obtaining a predetermined rectifying performance has an effect on an operation cost of the rectifying column. It is known, for example, that the compositions of liquids accumulated in each of the compartments of the rectifying column is usually various, and that the liquids in the first of the compartments are rich in volatile components. It is useless in terms of energy saving to charge the heating energy into each of the compartments without any consideration.

In the prior art rectifying system, products beyond the range of a specification have been taken out from the rectifying system until the operation condition of the rectifying system is determined by repeating an increase and decrease of heating energy by the method of trial and error to attain a predetermined rectifying performance, for example, to obtain a product of a predetermined specification from the top portion and the bottom portion of a rectifying column. The increase of the yield of the product ceases inevitably, however, until the operation conditions are determined. This has been a great problem in rectifying columns, in which the components of feed are very often changed.

SUMMARY OF THE INVENTION

It is an object of the present invention to decrease the energy required for evaporation of raw materials in the rectifying column and to reduce a cost of rectification.

To accomplish this object, the present invention provides a method for rectification comprising steps of;

supplying raw materials to a rectifying column from a raw material feed pipe arranged on the middle level of the column;

returning a refluent fluid to the column from a refluxing pipe arranged in the upper portion of the column;

overflowing a hold-up from a bottom tank having a higher surface of a liquid to a bottom tank having a lower surface of a liquid in a bottom portion of the column, the bottom portion being divided into at least two bottom tanks having successively lower surface levels of the hold-up;

heating the hold-up in each of bottom tanks;

exchanging heat by bringing a vapor produced by heating the hold-up into counter-current contact with the refluent liquid returned to the rectifying column on plates arranged in the rectifying column and raw material fed on the middle level of the column, the refluent liquid from the lowest plate flows toward the bottom tank having the highest surface of the liquid;

taking out a vapor from the top of the rectifying column and cooling the vapor, a part of the vapor being taken out as a product and the rest of the vapor being used as the refluent liquid; and taking out the hold-up from the bottom tank having the lowest surface of the liquid.

Further, the present invention provides an apparatus for rectification comprising:

a rectifying column having a raw material feed pipe in the middle level thereof, an offtake pipe for taking out the vapor from the top of the rectifying column, a reflux pipe for returning the refluent liquid to the inside of the column in the upper portion of the rectifying column and plates for exchanging heat by bringing the vapor into contact with the refluent liquid and the raw material;

at least two bottom tanks having surfaces of liquids successively lower in height, in the bottom portion of the rectifying column, wherein the refluent liquid from the lowest plate flows toward the bottom tank having the highest surface of the liquid and the refluent liquid overflows from the tank having a higher surface of the liquid to the tank having a lower surface of the liquid;

means for heating the hold-up in each of the bottom tanks; and an offtake pipe for taking out bottoms from the bottom tank having the lowest surface of the liquid.

In this application, there is disclosed a technology which saves energy charged into a rectifying column by a rectifying system wherein a bottom portion of a distillation column is partitioned into a plurality of compartments; each of the compartments is heated independently; and liquids are tranferred successively and continuously from one of said compartments to one of said compartments by means of overflow of the liquids. If the system has three partitioned compartments, the liquids are successively and continuously transferred from the second compartment to a third compartment and so on if there were four compartments. It is an object of the present invention to provide an optimum method for operating such a rectifying system.

It is another object of the present invention to provide an optimum method for operating a rectifying system by appropriately adjusting the charge of heating energy without determining the operation conditions by repeating the increase and decrease of the heating energy by the method of trial and error.

The above objects and other objects and advantages of the present invention will become apparent from the detailed description to follow, taken in connection with the appended drawings.

DESCRIPTION OF THE PREFERRED EMBODIMENT

Figure 1:
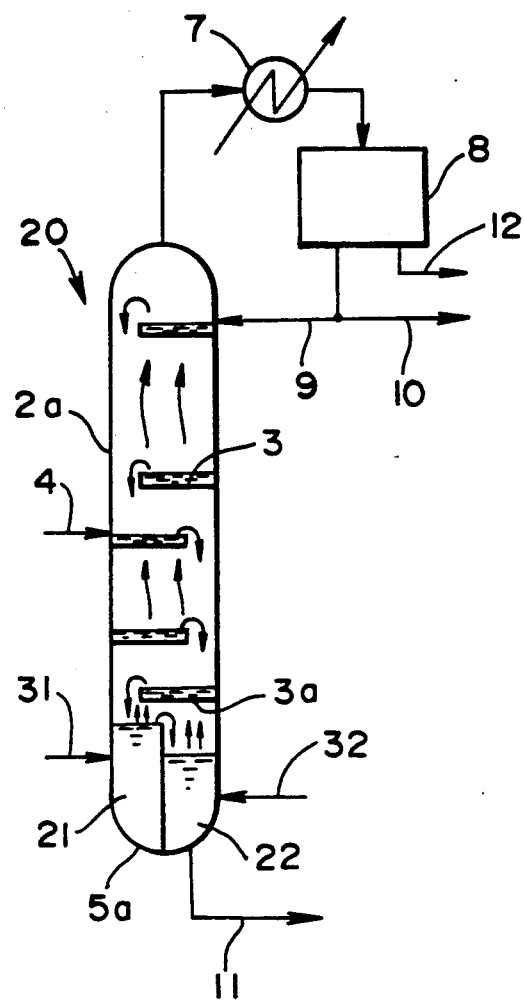
FIG. 1 is a conceptual illustration of a first example of rectifying apparatus of the present invention.

Even in a rectification plant, an energy saving is an important problem. Therefore, there have been hitherto conducted a study on a rectification apparatus which calculates upon a total effect on an energy saving inclusive of attached installations such as a flow change type apparatus wherein a raw material blow-in position is taken into consideration, or a waste-heat recovery type apparatus by use of a heat exchanger. The attached installations, however, are required for the prior art type apparatuses and operations with the prior art type apparatuses are complicated.

In the method for rectification and the apparatus therefor of the present invention, a great effect can be produced by a simple change of an apparatus. That is to say, a bottom portion of the prior art type apparatus holding hold-up is divided into a plurality of bottom tanks. Differences in levels of the surfaces of an overflowing liquid in each of the bottom tanks are made so that the overflowing liquid can flow successively and continuously downward from the highest bottom tank to the lowest bottom tank. Any of hold-up in the bottom tank located higher than the lowest bottom tank is richer in components of low boiling point at least than the hold-up in the lowest bottom tank. Accordingly, in the bottom tanks located higher than the lowest bottom tank, the components of low boiling point can be evaporated by an amount of heating medium smaller than in the lowest bottom tank. As a result, the energy saving can be accomplished. That is to say, an entropy loss, is produced by mixing of fluids of different composition, but a separation capability of a separation system is increased by a decrease of the entropy loss.

The essential point in the present invention is that liquids in each tank which is made by partitioning the inside of the rectifying column are separately and independently heated and successively transferred to the next tank by means of the overflow of the liquids. That is, since mixing of liquids containing a large amount of hold-up increases entropy, that is, differences of the concentrations of the liquids are partially caused by distillation of the liquids, but a certain concentration of the liquids is obtained by the mixing of the liquids, entropy of the entire liquids is increased thermodynamically, but an increase of entropy of the entire liquids can be decreased when the liquids are heated by decreasing the volume of mixed liquids by putting the liquids in each tank obtained by partitioning the inside of the rectifying column into a plurality of bottoms. This means that the charge of energy necessary for heating and rectifying a necessary amount of the liquids is reduced.

When the inside of the bottom of the rectifying column is partitioned into a plurality of bottoms by the use of a complicated mechanism represented by a pumping means for transferring the bottom liquids from one bottom tank to the other, problems which occur include clogging of pipes with foreign substances accumulated at the bottom of the tanks, leakage of the liquids from welded portions, destruction of the tanks by jetting and flooding of contents critically generated in the rectifying column and increased difficulty of control of temperatures. Therefore, a mechanism as simple as possible is desirable in order to transfer the bottom liquids from one tank to the other in the rectifying column. Moreover, since rectifying operations are carried out in a plurality of rectifying columns in many cases, disadvantages due to the complicated mechanism of the rectifying columns raise a serious problem in terms of a control system and construction cost of the rectifying columns. Therefore, the above-described problem of the transfer of the bottom liquids from one bottom tank to the other, each of which is obtained by partitioning the inside of the rectifying column, is solved by the use of the publicly phenomenon of overflow made effective by means of stabilization of the rectifying operations, reduction of the construction costs of the rectifying column, and simplification of the operations by adopting means wherein the liquids are separately and independently heated in each bottom tank, obtained by partitioning the inside of the bottom of the rectifying column, and are successively and continuously transferred from one bottom tank to the other by means of the overflow.

To save energy, the amount of heating energy which is regarded as comprehensively appropriate should be charged into each of the compartments by causing the amount of energy to correspond to the compositions of the liquids in each of the compartments. The effect of the saving of charged energy in the present invention shows a high level of several tens of percent as shown in Table 1 below, and the present invention generally produces a great effect of energy saving in a rectifying system carrying out a continuous operation, particularly when the number of rectifying columns is high.

TABLE 1

The effect of reducing energy in a rectifying column (calculated at 2500 yen/ton [steam])

|  | Rectifying Column for Benzol | Crude Oil Topping Column |
|---|---|---|
| Charged amount of steam | 3.2 ton/hr | 10-25 ton/hr |
| Reduction Ratio of Amount of Steam: |  |  |
| Two-piece type: 10% | Saving of 7 mil. yen/year | Saving of from 2,200 to 5,500 yen/year |
| Three-piece type: 14% | Saving of 9 mil. 80 thousand yen/year | Saving of from 3,080 to 7,700 yen/year |

An example of the apparatus of the present invention will be described below with specific reference to FIG. 1. A description of the prior art apparatus shown in FIG. 10 will be omitted, the same symbols being put on the position where there is the same construction of the present invention as that of the prior art apparatus.

Rectifying apparatus 20 of the present invention is different from the prior art rectifying apparatus in bottom portion 5a of column body 2a. To make a description simple, a case that bottom portion 5a is divided into bottom tanks 21 and 22 will be described. An overflowing fluid flows from lowest plate 3a of the column in upper bottom tank 21. The overflowing fluid from upper bottom tank 21 flows to lower bottom tank 22. A hold-up is taken out from lower bottom tank 22 through second offtake pipe 11. On the other hand, a heating medium piping for heating the hold-up inside the tanks, for example, steam pipes 31 and 32 are connected to bottom tanks 21 and 22 respectively to blow steam into bottom tanks 21 and 22. Plates 3, raw material feed pipe 4, condenser 7, reflux tank 8, refluxing pipe 9, drain pipe 12, first offtake pipe 10 and second offtake pipe 11 which are arranged in column body 20 have the same construction and function as that of the prior art example.

There was conducted a simulation test on a steam rectification apparatus, wherein a material consisting of 21 components including 20 components ranging from benzene to anthracene and water are supplied from the raw material feed pipe to the apparatus, with three components consisting of benzene, toluene and xylene as distillate and components other than these three components as bottoms were taken out of lowest bottom tank 22.

In the simulation, the flow rate B of steam to be fed to upper bottom tank 21 was increased stepwise from 10 to 100 kg mol/h. The volume of upper bottom tank 21 was the same as the volume of lower bottom tank 22. The flow rate A of steam to be fed to lower bottom tank 22 and the reflux ratio [(the flow rate in reflux pipe 9/(the flow rate in first offtake pipe 10)] were controlled so that the composition of the top of the column can be 96.0% and the composition of the bottom of the column 0.35% in the sum of mol fractions of benzene, toluene and xylene.

Figure 10:
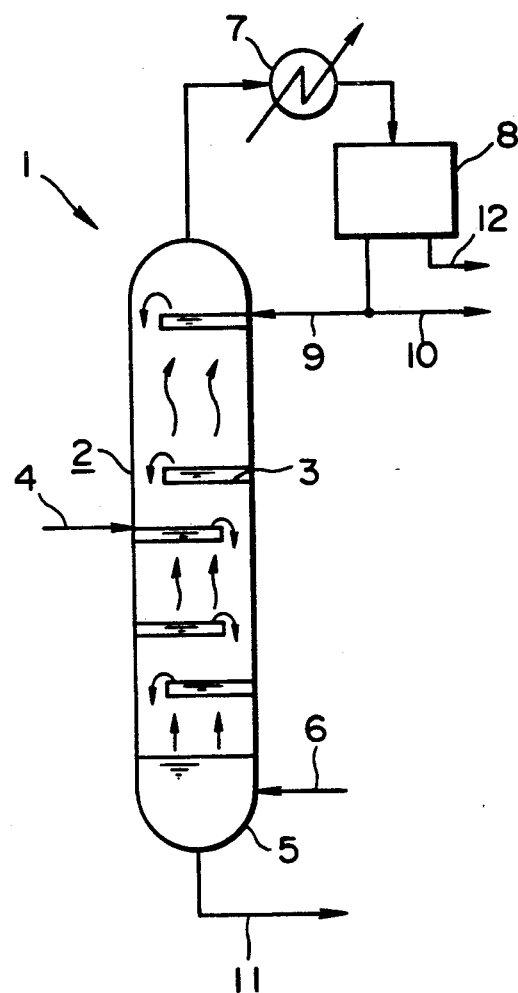
FIG. 10 is a conceptual illustration of a rectifying apparatus of a prior art example.

The results of the above-mentioned simulation will be shown in graphical respresentations of FIGS. 2 to 6 compared with values in the prior art example of FIG. 10. The values according to the prior art method will be shown with symbol ●.

Figure 2:
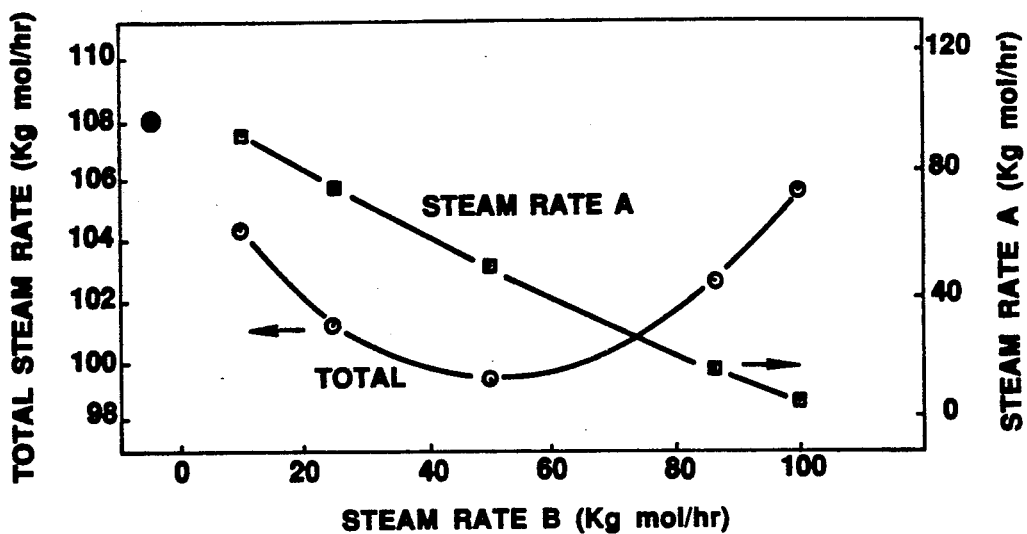
FIG. 2 is a graphical representation indicating the relation between a steam rate blown in an upper bottom tank and the total steam rate of the present invention.
Figure 3:
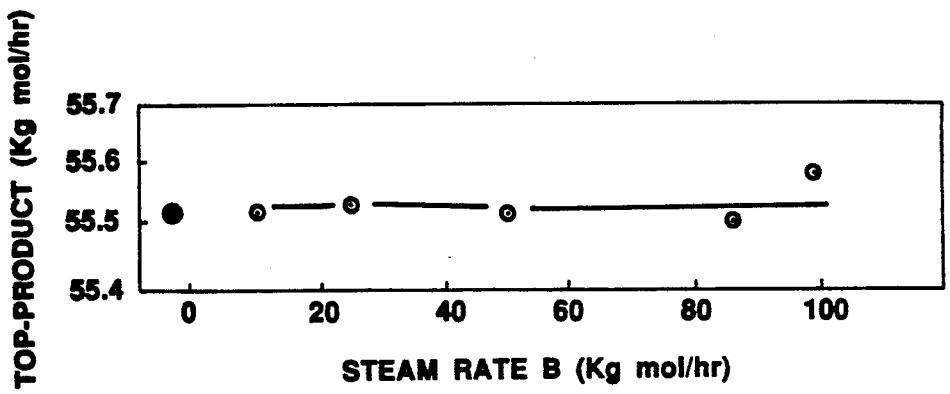
FIG. 3 is a graphical representation indicating the relation between a steam rate blown in the upper bottom tank and a top production amount of the present invention.
Figure 4:
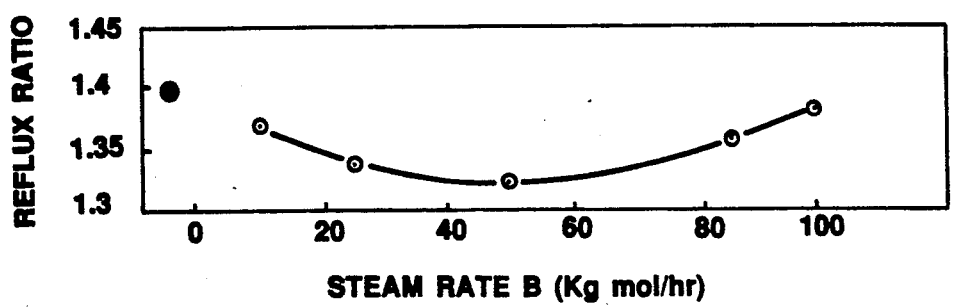
FIG. 4 is a graphical representation showing the relation between a steam rate blown in the upper bottom tank and a reflux ratio of the present invention.
Figure 5:
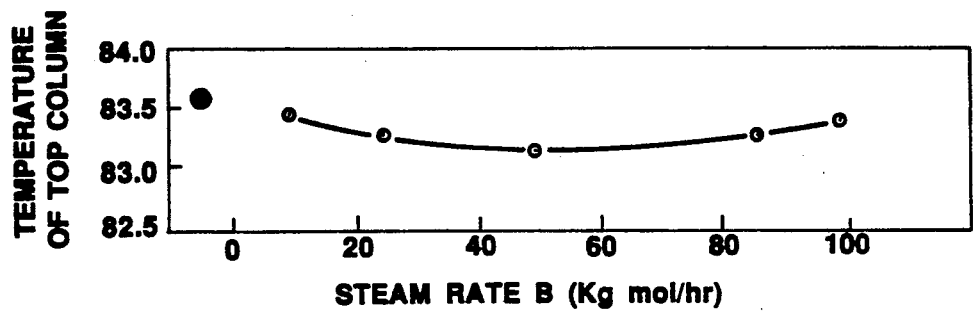
FIG. 5 is a graphical representation designating the relation between a steam rate blown in the upper bottom tank and a temperature of the top of the rectifying column of the present invention.
Figure 6:
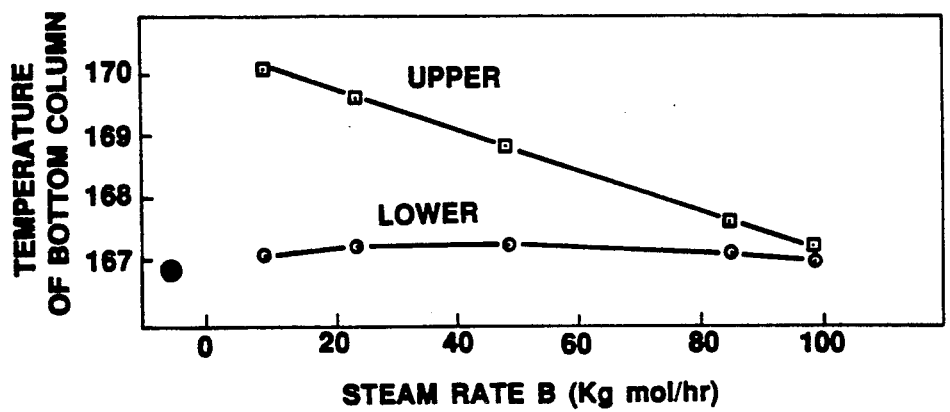
FIG. 6 is a graphical representation designating the relation between a steam rate blown in the upper bottom tank and a temperature of the bottom of the rectifying column of the present invention.

In FIGS. 2 to 6, the flow rate B of steam is represented in the abscissa. In FIG. 2, the total flow rate of steam and the flow rate A of steam are represented in the ordinate. In FIG. 3, the amount of the product obtained from the first offtake pipe 10 is represented in the ordinate. In FIG. 4, the reflux ratio is represented in the ordinate. In FIG. 5, the temperature of the top of the column is represented in the ordinate. In FIG. 6, the temperature of the bottom of the column is represented in the ordinate. The values of the prior art example are shown with symbol ● at the left end of the graphical representations. The values of the prior art example have nothing to do with the flow rate B of steam since the bottom tank is not divided.

As shown in FIG. 2, the lowest value of the total amount of steam is approximately 99 kg mol/h in case of using the method of the present invention while the total amount of steam is approximately 108 kg mol/h in the prior art example wherein the bottom portion of the column is not divided. Therefore, approximately 8.3% of energy is saved in the method of the present invention. FIG. 2 also shows that, when the flow rate A of steam is substantially equal to the flow rate B of steam, the total amount of steam becomes the lowest value.

Figure 7:
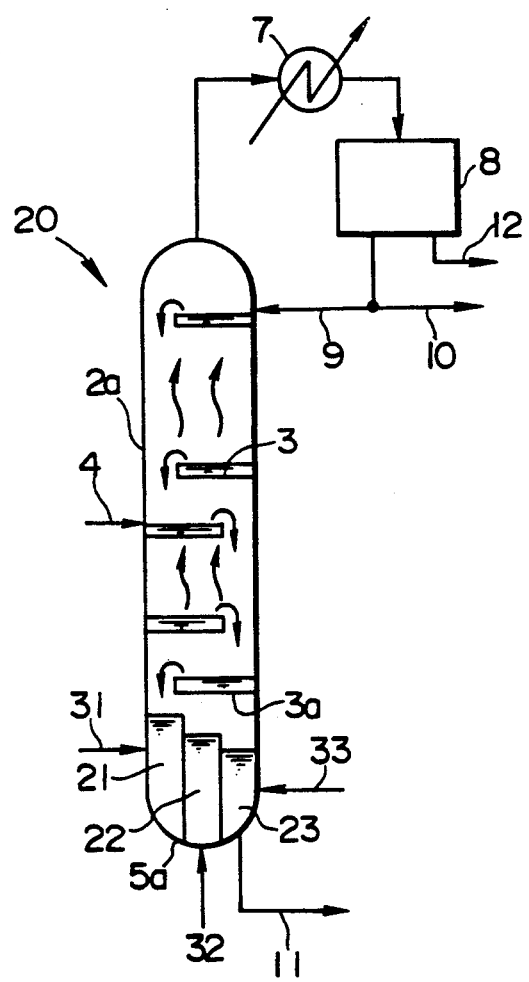
FIG. 7 is a conceptual illustration of a second example of rectifying column of the present invention.

In the first example, the case where the bottom portion was divided into two bottom tanks was explained. The bottom portion, however, can be divided into more than two. A simulation was conducted on the case where the bottom portion was divided into three on the same condition as mentioned above, the lowest value of the total amount of steam was approximately 95.8 kg mol/h while the total amount of steam was approximately 108 kg mol/h in the prior art example. In the case that the bottom portion was divided into three, 11.3% of energy was saved. This case produces the effect better than the case where the bottom portion was divided into two. FIG. 7 is a conceptual illustration of a second example of rectifying apparatus of the case where the bottom portion is divided into three bottom tanks. There are three bottom tanks 21, 22 and 23 having the surfaces of liquids different in height. Steam is blown in each of the three bottom tanks 21, 22 and 23 from steam pipes 31, 32 and 33. An overflowing fluid in the highest bottom tank 21 flows to bottom tanks 22 and 23 successively. Bottoms are taken out of the lowest bottom tank 23 through second offtake pipe 11. A heating energy of 0.8 to 1.2 E/N is supplied to one bottom tank when the total heating energy supplied to the hold-up is E and the number of bottom tanks are N.

Figure 8:
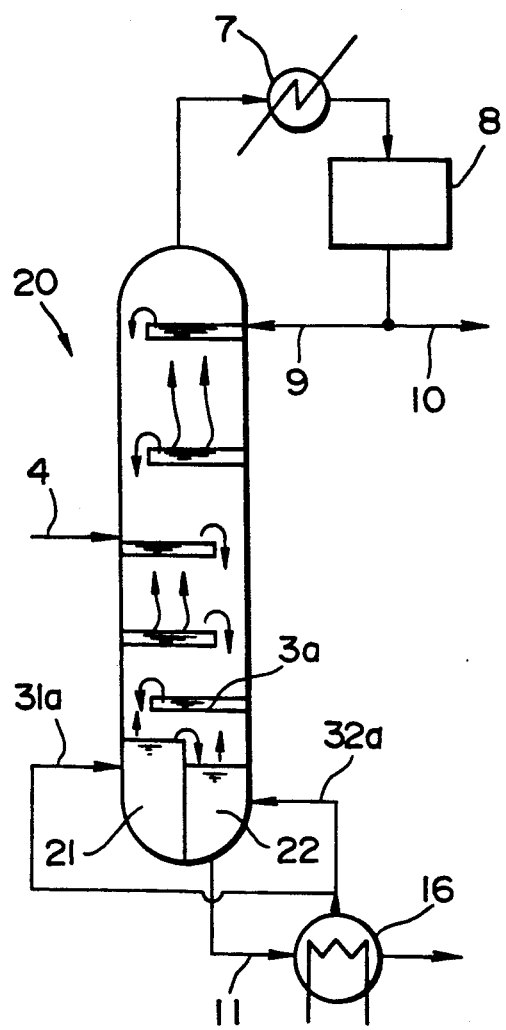
FIG. 8 is a conceptual illustration of a third example of rectifying column of the present invention.

FIG. 8 is a schematic illustration of a third example of rectifying apparatus different from the first example described with specific reference to FIG. 1. In the third example, reboiler 16 for heating bottoms from second offtake pipe 11 is mounted on the rectifying apparatus and the bottoms are heated by returning vapor of the heated bottoms to bottom tanks 21 and 22. The effect of the energy saving is also seen in this rectifying apparatus as in the rectifying apparatus of FIG. 1.

Since the steam as a heating medium does not come in contact with a raw material and a refluent fluid in the third example, the second example can be used in the case that the raw material has a possibility of dissolving and deteriorating due to its contact with the steam. On the other hand, in the first example, since the steam is introduced into the rectifying column, the first example has merit in that a partial pressure of components of low boiling point to be taken out as a product decreases and, in this connection, a temperature for heating the bottom tanks can be lowered to obtain the same amount of evaporated components. Accordingly, the first example can produce a high effect, being applied to the raw material having a possibility of deteriorating when the temperature is raised.

Figure 9:
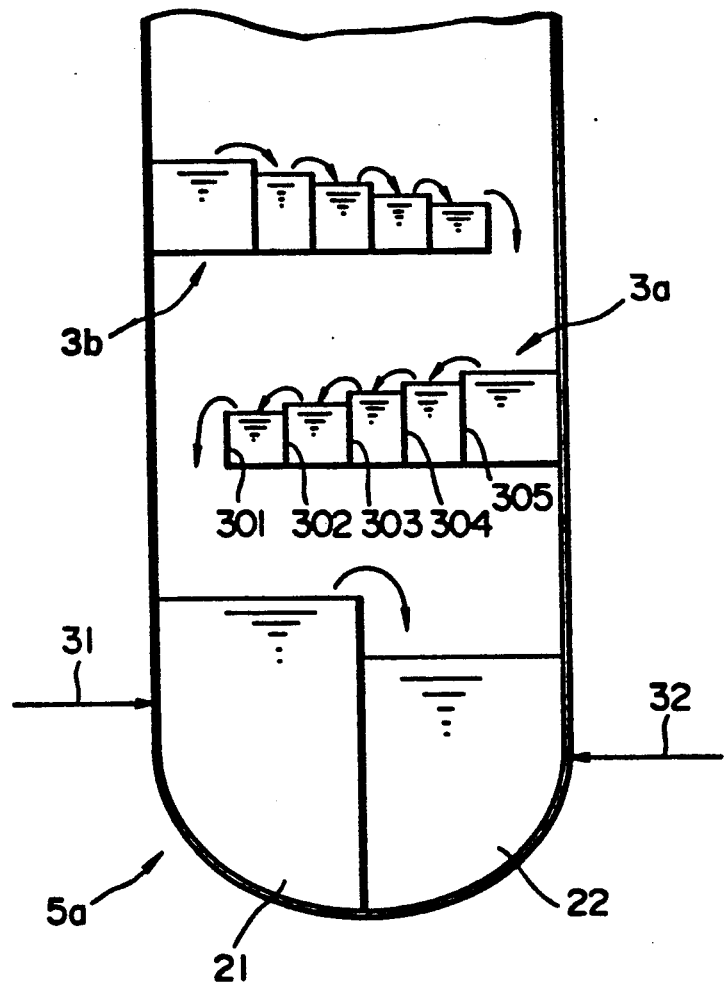
FIG. 9 is a sectional view schematically showing plates with a plurality of dams of the rectifying column and the bottom tanks of the present invention.

FIG. 9 is a sectional view of the column showing plates 3a, on which a plurality of dams 301 to 305 having different heights are mounted, in the first example. Dams 301 to 305 are mounted on plates 3a, 3b so that they can grow higher in this order. As shown with arrow symbols, the overflowing fluid passes over dams 305, 304, 303, 302 and 301 successively and falls on a lower plate or on the bottom portion of the column. The plates 3a, 3b are arranged so that when the overflowing fluid falls on the lower plate, it can flow into the internal side of the highest dam of the lower plate, and when the overflowing fluid falls from the lowest plate 3a into the bottom of the column, it can fall on the bottom tank 21 having the highest surface level of liquid.

In this way, in the case when a plurality of the dams are arranged on the plates, the total amount of steam is decreased and the energy can be saved as much as the case when the bottom portion is divided into a plurality of bottom tanks in comparison with the case when dam 301 is arranged only at the end of a plate.

It is naturally possible in the third example to obtain an effect of the energy saving by use of the plates, on which a plurality of dams are arranged.

A fourth example wherein the method of the present invention was applied to a benzol stripper will be shown.

The rectifying column distills liquids of components of low boiling point temperature such as benzene, toluene, xylene and the like. A bottom portion of the rectifying column is divided into two compartments. The liquids are transferred from an upstream compartment to a downstream compartment over a partition wall by means of the overflow of the liquids.

The rectifying column was operated with a flow quantity of feed at 176 m/hr so that the specification can have 88.5% and 0.0756% of products respectively in accord with the proportions of the components of low boiling point temperature in a top portion and a bottom portion of the rectifying column.

A total amount of steam was measured by changing the amount of steam 1 and steam 2 supplied into the (first) upstream compartment and the (second) downstream compartment of the rectifying column while realizing the above-mentioned operation conditions. The result is shown in Table 2. It is understood from Table 2 that the total amount of steam used when the steam 1 is charged into the upstream compartment at 1450 kgf/hr and the steam 2 is charged into the downstream compartment at 1357 kgf/hr is minimized.

TABLE 2

| | The amount of charged heating energy and the total amount of charged heating energy (percentage (%) in parentheses) | | |
|---|---|---|---|
| # | Flow Quantity of Steam 1 (kgf/hr) | Flow Quantity of Steam 2 (kgf/hr) | Total Quantity of Steam (kgf/hr) |
| 1 | 843 (29.7) | 2000 (70.3) | 2843 |
| 2 | 1000 (35.3) | 1830 (64.7) | 2830 |
| 3 | 2404 (50.0) | 1404 (50.0) | 2808 |
| 4 | 1450 (51.7) | 1357 (48.3) | 2807 |
| 5 | 1500 (53.4) | 1308 (46.6) | 2808 |
| 6 | 1550 (55.2) | 1260 (44.8) | 2810 |

Subsequently, the case where the bottom portion of the above-described rectifying column was partitioned into three compartments and liquids were transferred by means of the overflow thereof via two partition walls from the most upstream compartment to the most downstream compartment will now be described. To realize the same operation condition of the rectifying column with that of the above-described rectifying column, a total quantity of steam was measured by changing the quantity of steam supplied to steam 1 of the upstream (first) compartment, steam 2 of the downstream (second) compartment and steam 3 of the lower downstream (third) compartment. Products at the bottom of the rectifying column were taken out of the bottom of the most downstream compartment. The result is shown in Table 3. It is understood from Table 3 that the total quantity of steam was minimized when more steam was supplied into the higher upstream compartments (920 kgf/hr to the steam 1, 896 kgf/hr to the steam 2 and 870 kgf/hr to the steam 3).

TABLE 3

| | The amount of charged heating energy and the total amount of charged heating energy (percentage [%] in parentheses) | | | |
|---|---|---|---|---|
| # | Flow Quantity of Steam 1 (kgf/hr) | Flow Quantity of Steam 2 (kgf/hr) | Flow Quantity of Steam 3 (kgf/hr) | Total Quantity |
| 1 | 862 (31.8) | 896 (33.1) | 950 (35.1) | 2708 |
| 2 | 880 (32.6) | 896 (33.2) | 924 (34.2) | 2700 |
| 3 | 896 (33.3) | 896 (33.3) | 896 (33.3) | 2688 |
| 4 | 920 (34.3) | 896 (33.4) | 870 (32.3) | 2686 |
| 5 | 985 (36.6) | 896 (33.3) | 808 (30.1) | 2689 |
| 6 | 1005 (37.4) | 896 (33.3) | 789 (29.3) | 2690 |

What is claimed is:
1. A method for rectification comprising steps of:
supplying raw materials to a rectifying column from a raw material feed pipe arranged at a middle level of said column;
returning a refluent fluid from a refluxing pipe arranged at an upper portion of said column to said column;
continuously overflowing a hold-up liquid from a first bottom tank having a higher surface of a liquid to a second bottom tank having a lower surface of a liquid in a bottom portion of said column, said bottom portion of said column being divided into at least said first and second bottom tanks having successively lower surface levels of the hold-up;

heating independently said hold-up in each of said bottom tanks, depending on the composition of the hold-up;

exchanging heat by bringing a vapor produced by heating the bottom into counter-current contact with the refluent liquid returned to the rectifying column, the contact being performed on plates arranged in said rectifying column and the refluent liquid from a lowest plate of the plates flowing toward the bottom tank having the highest surface level of the liquid;

taking out a vapor from the top of said rectifying column and cooling said taken out vapor into condensed components;

taking a part of said condensed components out as a product and using the rest of the condensed components as the refluent liquid; and taking out liquid from said bottom portion of said column only from the bottom portion of the bottom tank having the lowest surface level of the liquid.

2. The method of claim 1, wherein said heating of the hold-up is a heating for which a heating energy of 0.8 to 1.2 E/N is supplied to one bottom tank when the total heating energy supplied to the hold-up is E and the number of bottom tanks are N.

3. The method of claim 1, wherein said heating of the hold-up includes a heating by blowing a heating medium in each of the bottom tanks.

4. The method of claim 1, wherein said heating medium is steam.

5. The method of claim 1, wherein said heating of the hold-up includes a heating of the hold-up by use of a reboiler arranged outside the rectifying column and by returning vapor of the hold-up into the bottom tanks.

6. The apparatus of claim 1, wherein at least one of said plates has a plurality of dams successively lower in height mounted thereon, whereby overflowing liquid passes over said dams successively.

* * * * *

UNITED STATES PATENT AND TRADEMARK OFFICE
CERTIFICATE OF CORRECTION

PATENT NO. : 5,200,040

DATED : April 6, 1993

INVENTOR(S) : NAKA, Yuji et al.

It is certified that error appears in the above-identified patent and that said Letters Patent is hereby corrected as shown below:

Column 1, line 13, "a" should be --an--; and "an" should be --a--.

Column 2, line 21, "a" should be --the--.

Signed and Sealed this

Sixth Day of September, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,200,040

DATED : April 6, 1993

INVENTOR(S) : NAKA, et al

It is certified that error appears in the above-indentified patent and that said Letters Patent is hereby corrected as shown below:

Title page, Item [73] Assignee, add —Yuji Naka, Yokohama, Japan—.

Signed and Sealed this

Eleventh Day of April, 1995

Attest:

BRUCE LEHMAN

Attesting Officer

Commissioner of Patents and Trademarks